| US009327690B2

United States Patent
Yokomachi et al.

(10) Patent No.: US 9,327,690 B2
(45) Date of Patent: May 3, 2016

(54) TRANSMISSION

(71) Applicant: HONDA MOTOR CO., LTD., Tokyo (JP)

(72) Inventors: Kenji Yokomachi, Wako (JP); Noriaki Imaoka, Wako (JP); Masashi Ohnuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 59 days.

(21) Appl. No.: 14/252,264

(22) Filed: Apr. 14, 2014

(65) Prior Publication Data

US 2014/0305764 A1    Oct. 16, 2014

(30) Foreign Application Priority Data

Apr. 16, 2013  (JP) ................. 2013-085498

(51) Int. Cl.
| | |
|---|---|
| *F16H 63/34* | (2006.01) |
| *B60T 1/06* | (2006.01) |
| *B60T 1/00* | (2006.01) |
| *F16D 63/00* | (2006.01) |
| *F16D 125/66* | (2012.01) |

(52) U.S. Cl.
CPC ................. *B60T 1/005* (2013.01); *B60T 1/062* (2013.01); *F16D 63/006* (2013.01); *F16H 63/3416* (2013.01); *F16D 2125/66* (2013.01)

(58) Field of Classification Search
CPC ............................ F16H 3/3416; F16H 63/3425
USPC ............................................. 192/219.5
See application file for complete search history.

(56) References Cited

U.S. PATENT DOCUMENTS

| 3,386,532 A | * | 6/1968 | Moss ............................ 188/31 |
| 3,539,039 A | * | 11/1970 | Chana ........................ 192/219.5 |
| 4,200,002 A | * | 4/1980 | Takahashi ..................... 74/530 |

FOREIGN PATENT DOCUMENTS

| CN | 102166964 A | 8/2011 |
| CN | 201982642 U | 9/2011 |
| DE | 19933618 A1 | 1/2001 |
| JP | 62-15650 U | 1/1987 |
| JP | 62-163362 U | 10/1987 |
| JP | 07205773 A | * | 8/1995 | ............... B60T 1/06 |
| JP | 3900786 B2 | 4/2007 |

* cited by examiner

*Primary Examiner* — Richard Lorence
(74) *Attorney, Agent, or Firm* — Westerman, Hattori, Daniels & Adrian, LLP

(57) ABSTRACT

A parking lock device includes: a transmission shaft supported by a first case and a second case and connected to drive wheels; a parking gear fixed to the transmission shaft; and a parking pole engageable with the parking gear. A cover member is fixed to an inner wall surface of the second case. The cover member covers at least an outer peripheral surface of the parking gear with a predetermined clearance therebetween in a state where the second case is joined to the first case. When the second case to which the cover member is attached in advance is joined to the first case to which the parking gear is attached in advance, the cover member is guided by the outer peripheral surface of the parking gear. Thus, the second case 13 can be joined to the first case easily.

6 Claims, 6 Drawing Sheets

TRANSMISSION

BACKGROUND OF THE INVENTION

1. Field of the Invention

The present invention relates to a transmission comprising: a first case; a second case to be joined to the first case; a transmission shaft connected to a drive wheel, the transmission shaft having opposite ends respectively supported by the first case and the second case; a parking gear fixed to the transmission shaft; a parking pole capable of engaging with the parking gear for restraining rotation of the transmission shaft; and a cover member fixed to an inner wall surface of the second case.

2. Description of the Related Art

Japanese Patent No. 3900786 discloses a parking lock device in which: a shaft end portion of a counter shaft that projects from a transmission case is supported by using a side cover joined to the transmission case; and a parking gear that is fixed to the shaft end portion of the counter shaft is caused to face an inner surface of the side cover.

SUMMARY OF THE INVENTION

In the meantime, in the above-described conventional parking lock device, the side cover is attached to the transmission case in a state where the counter shaft is attached to the transmission case in advance. Here, a bearing portion provided on the inner surface of the side cover has to be fitted to the shaft end portion of the counter shaft. Hence, the conventional device has a problem of deterioration in workability, because the shaft end portion and the bearing portion cannot be smoothly fitted to each other unless positioning of the side cover is accurately conducted.

The present invention has been made in view of the above-described circumstance. An object of the present invention is to enable smooth work to join a second case of a transmission to a first case thereof by using a cover member of a parking gear.

In order to achieve the object, according to a first feature of the present invention, there is provided a transmission comprising: a first case; a second case to be joined to the first case; a transmission shaft connected to a drive wheel, the transmission shaft having opposite ends respectively supported by the first case and the second case; a parking gear fixed to the transmission shaft; a parking pole capable of engaging with the parking gear for restraining rotation of the transmission shaft; and a cover member fixed to an inner wall surface of the second case, wherein the cover member covers at least an outer peripheral surface of the parking gear with a predetermined clearance therebetween in a state where the second case is joined to the first case.

According to the first feature of the present invention, the parking lock device includes: the first case; the second case to be joined to the first case; the transmission shaft connected to the drive wheel with the opposite ends of the transmission shaft respectively supported by the first case and the second case; the parking gear fixed to the transmission shaft; and the parking pole capable of engaging with the parking gear for restraining the rotation of the transmission shaft. Thus, it is possible to operate the parking lock device by bringing the parking pole into engagement with the parking gear. The cover member is fixed to the inner wall surface of the second case. Moreover, the cover member covers at least the outer peripheral surface of the parking gear with the predetermined clearance therebetween in the state where the second case is joined to the first case. Accordingly, when the second case is joined to the first case, the cover member is guided by an outer peripheral surface of the parking gear. Thus, the second case can be joined to the first case easily.

According to a second feature of the present invention, in addition to the first feature, there is provided the transmission further comprising: a support shaft configured to swingably support an intermediate portion of the parking pole; a lock claw formed on one end side of the parking pole and engageable with the parking gear; a pressed portion formed on another end side of the parking pole and pressed by a working member; and a first opening formed on an outer peripheral surface of the cover member to allow entry of the lock claw, wherein a distance from the support shaft to the lock claw is made different from a distance from the support shaft to the pressed portion.

According to the second feature of the present invention, the transmission includes: the support shaft which swingably supports the intermediate portion of the parking pole; the lock claw formed on the one end side of the parking pole and engageable with the parking gear; the pressed portion formed on the other end side of the parking pole and pressed by the working member; and the first opening formed on the outer peripheral surface of the cover member and allowing the entry of the lock claw. The parking lock device can be operated by causing the working member to press the pressed portion on the other end side of the parking pole, causing the parking pole to swing around the support shaft, and thus bringing the lock claw on the one end side of the parking pole into engagement with the parking gear through the first opening. In the parking pole, the distance from the support shaft to the lock claw is different from the distance from the support shaft to the pressed portion. Accordingly, if the parking pole is attached the other way round, such erroneous attachment of the parking pole can be discovered because the cover member interferes with the parking pole whereby the second case cannot be joined.

According to a third feature of the present invention, in addition to the second feature, the outer peripheral surface of the cover member includes a second opening located below the first opening.

According to the third feature of the present invention, the outer peripheral surface of the cover member includes the second opening located below the first opening. Thus, even if a foreign substance enters the cover member from the first opening, it is possible to discharge the foreign substance through the second opening.

According to a fourth feature of the present invention, in addition to any one of the first to third features, the cover member includes a plurality of arm portions projecting radially from the outer peripheral surface of the cover member.

According to the fourth feature of the present invention, the cover member includes the multiple arm portions projecting radially from the outer peripheral surface of the cover member. Thus, it is possible to block an elongated foreign substance having flexibility by use of the arm portions, and to prevent the foreign substance from winding around an outer periphery of the parking gear.

According to a fifth feature of the present invention, there is provided an assembling method of a transmission, in which the transmission comprising: a first case; a second case to be joined to the first case; a transmission shaft connected to a drive wheel, the transmission shaft having opposite ends respectively supported by the first case and the second case; a parking gear fixed to the transmission shaft; a parking pole capable of engaging with the parking gear for restraining rotation of the transmission shaft; and a cover member fixed to an inner wall surface of the second case, wherein the cover member covers at least an outer peripheral surface of the parking gear with a predetermined clearance therebetween in a state where the second case is joined to the first case, wherein the method comprising joining the second case, to which the cover member is attached in advance, to the first case to which the transmission shaft is attached in advance.

According to the fifth feature of the present invention, the second case to which the cover member is attached in advance is joined to the first case to which the transmission shaft is attached in advance. Hence, when the second case is joined to the first case, the cover member is reliably guided by the outer peripheral surface of the parking gear. Thus, the second case can be positioned and joined easily to the first case.

It is to be noted that an output shaft 15 of an embodiment corresponds to the transmission shaft of the present invention, a cam surface 23b of a parking pole 23 of the embodiment corresponds to the pressed portion of the present invention, a cam member 26 of the embodiment corresponds to the working member of the present invention, and first to fourth arm portions 29f to 29i of the embodiment correspond to the arm portions of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be described below with reference to FIG. 1 to FIG. 6.

Figure 1:
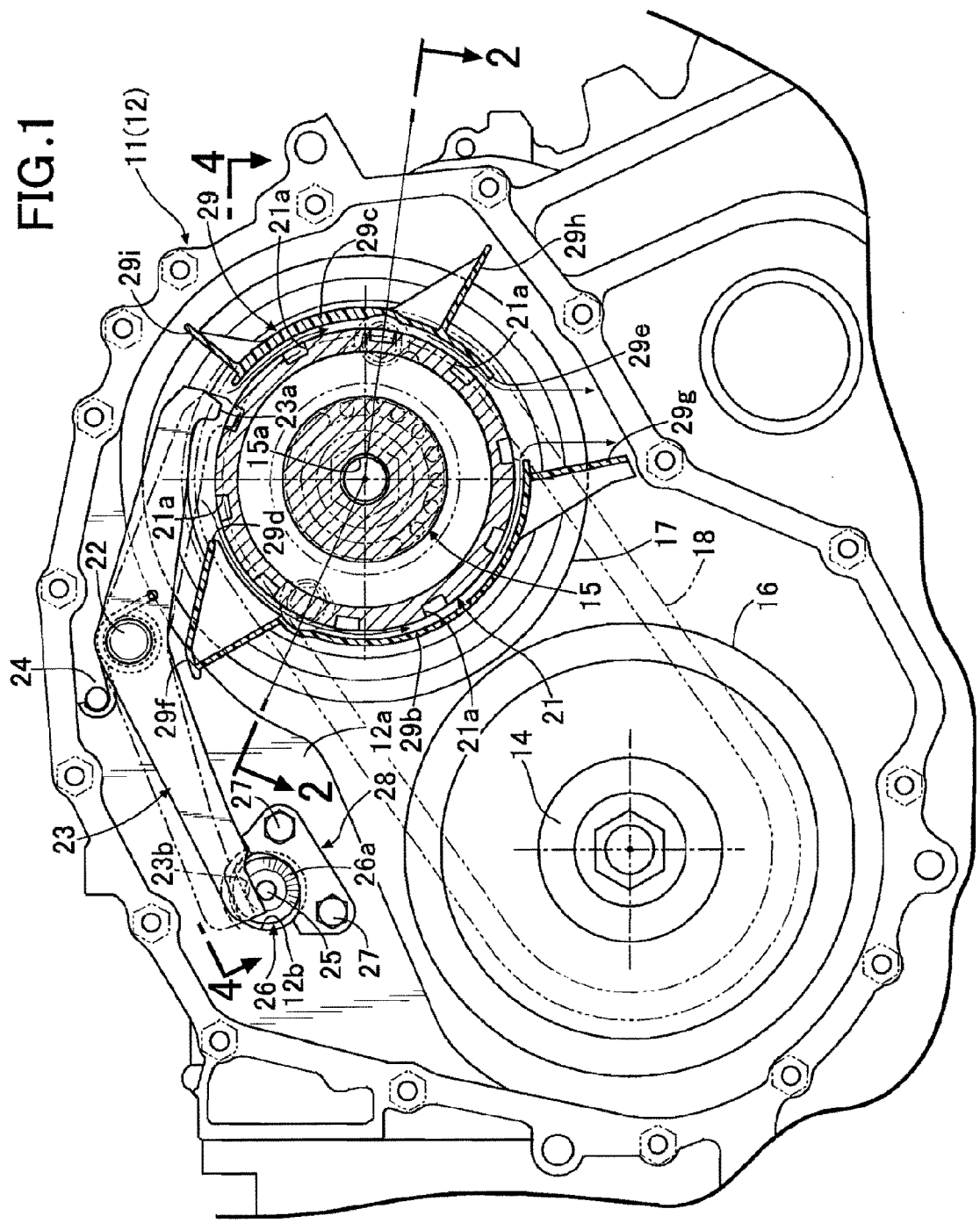
FIG. 1 is a sectional view of a belt type continuously variable transmission (a view seen from arrow directions of a line 1-1 in FIG. 2.
Figure 2:
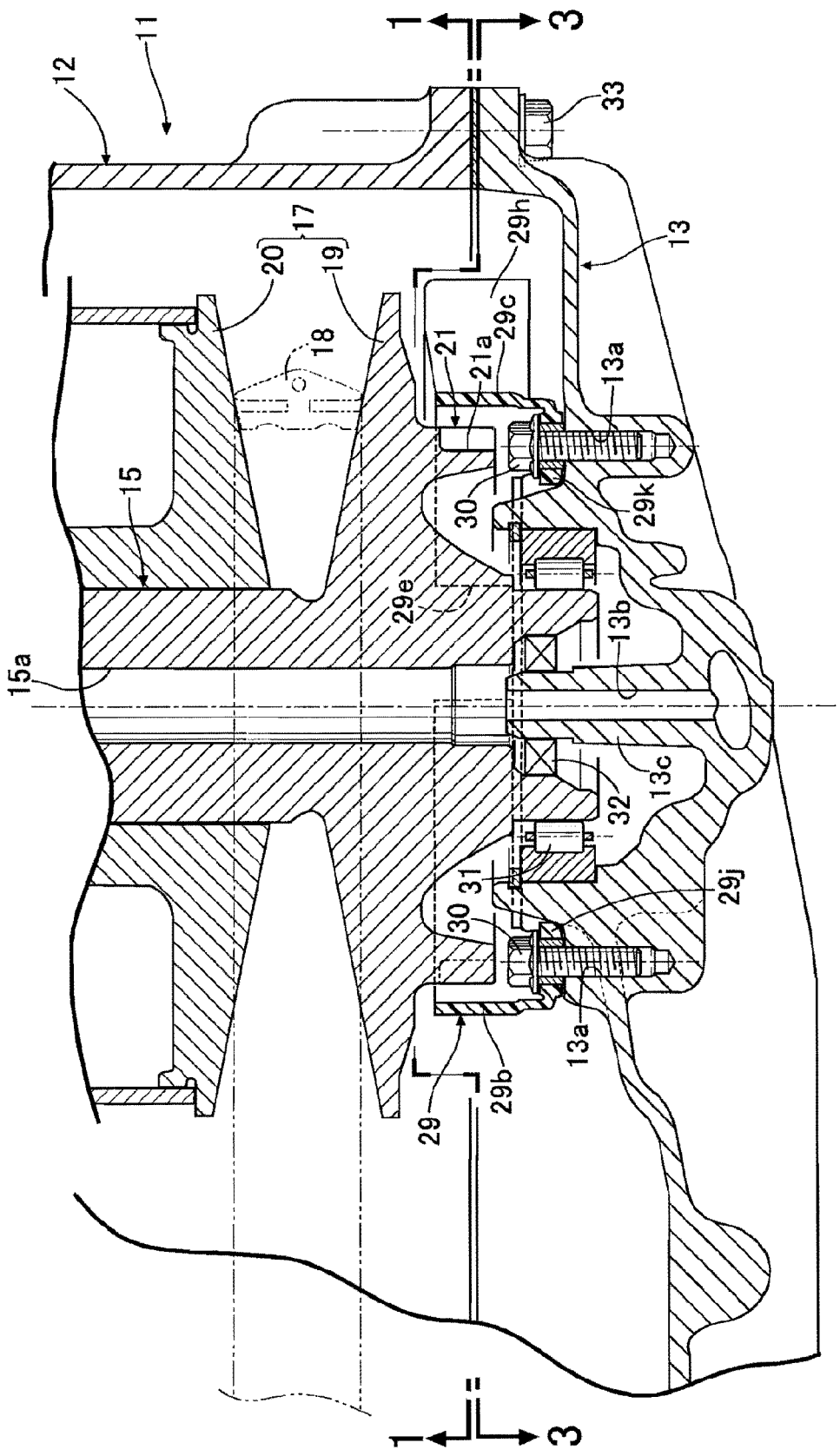
FIG. 2 is a sectional view taken along a line 2-2 in FIG. 1.
Figure 3:
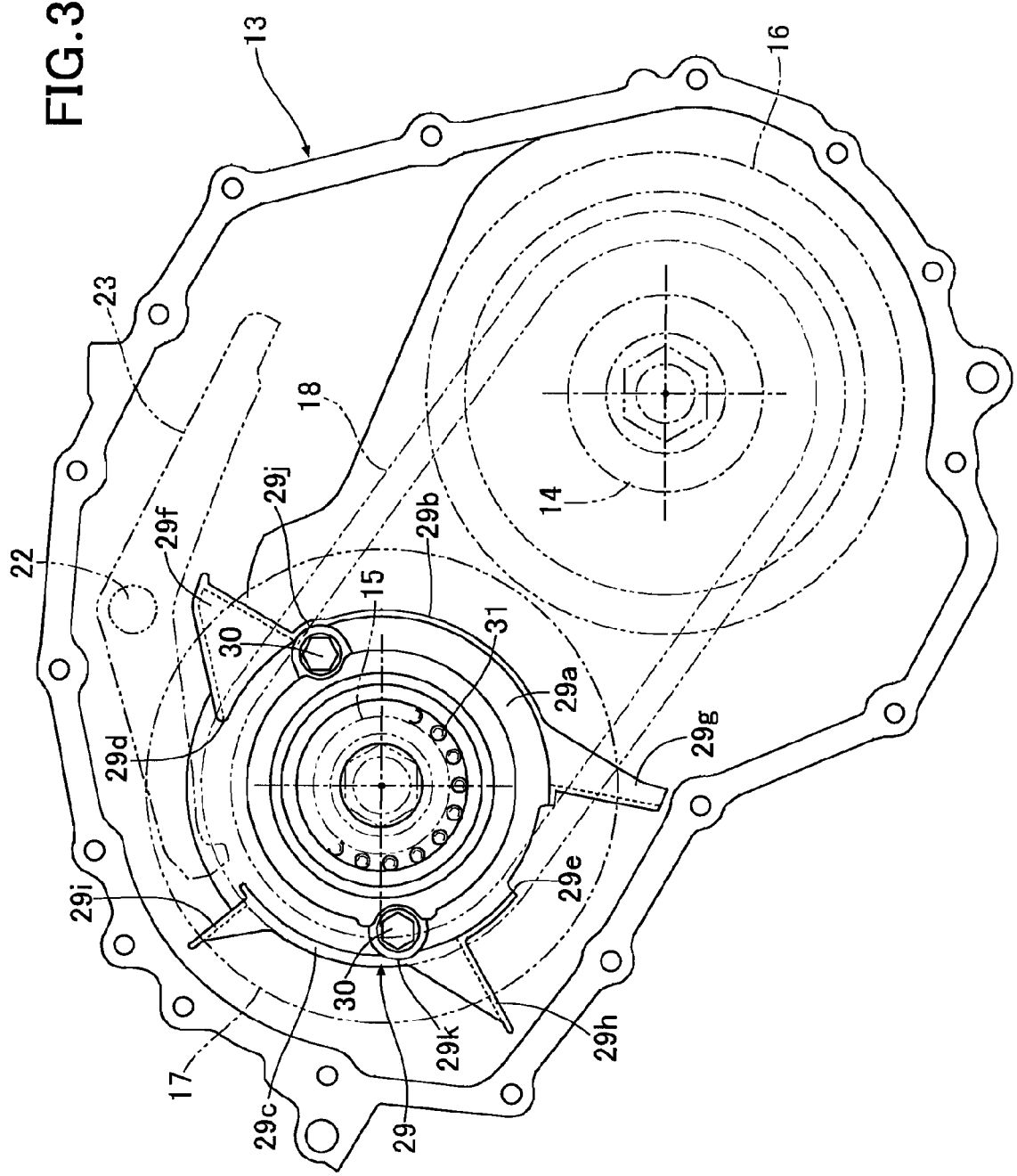
FIG. 3 is a view seen from arrow directions of a line 3-3 in FIG. 2.
Figure 4:
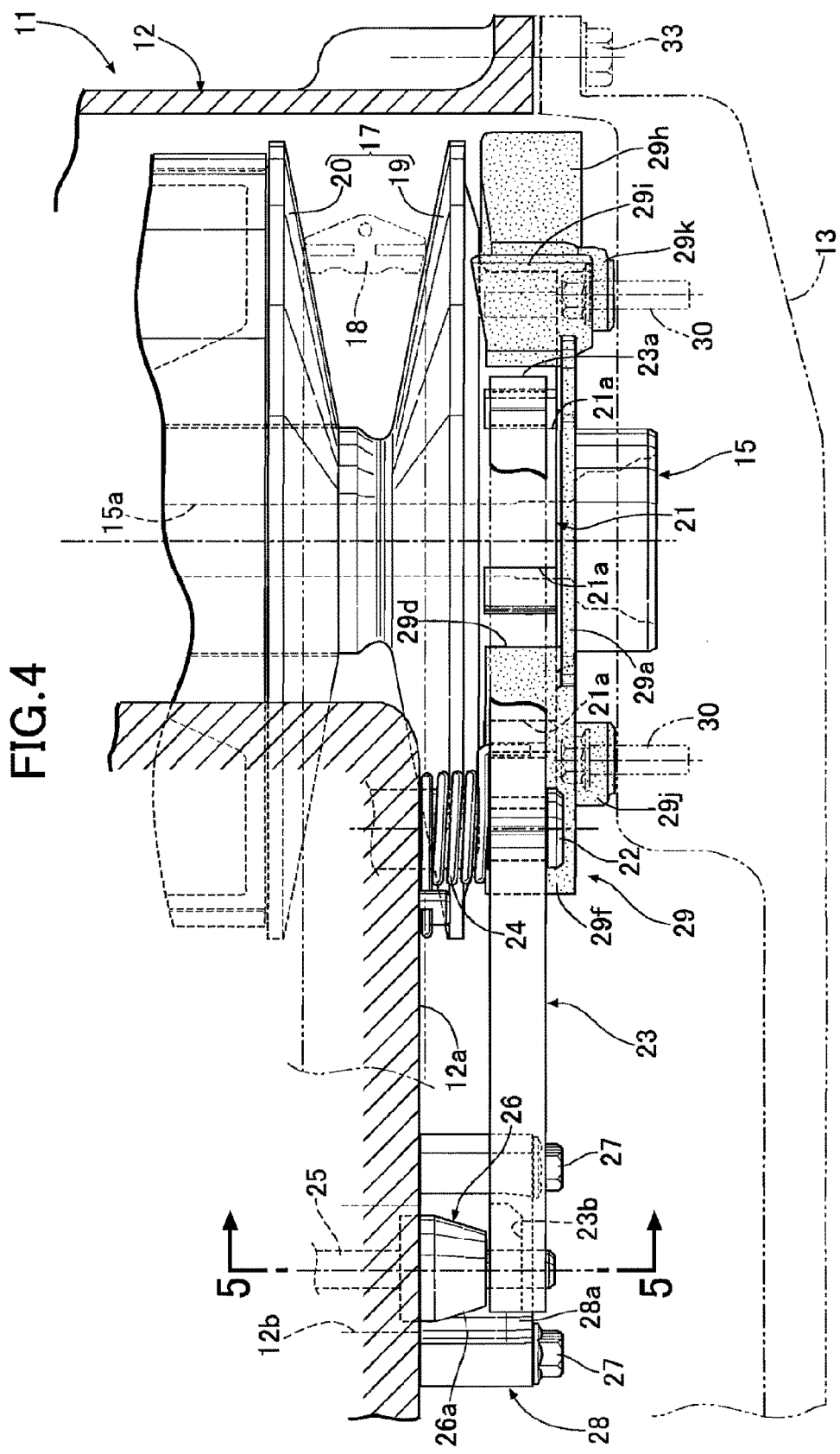
FIG. 4 is a sectional view taken along a line 4-4 in FIG. 1.
Figure 5A:
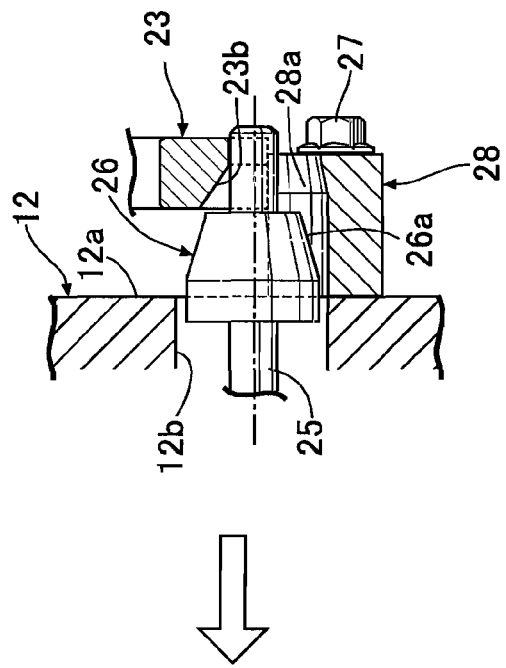
FIGS. 5A and 5B are sectional views each taken along a line 5-5 in FIG. 4.
Figure 5B:
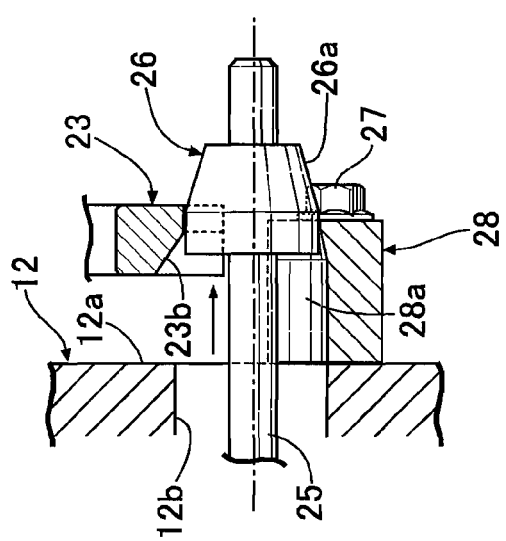
Figure 6:
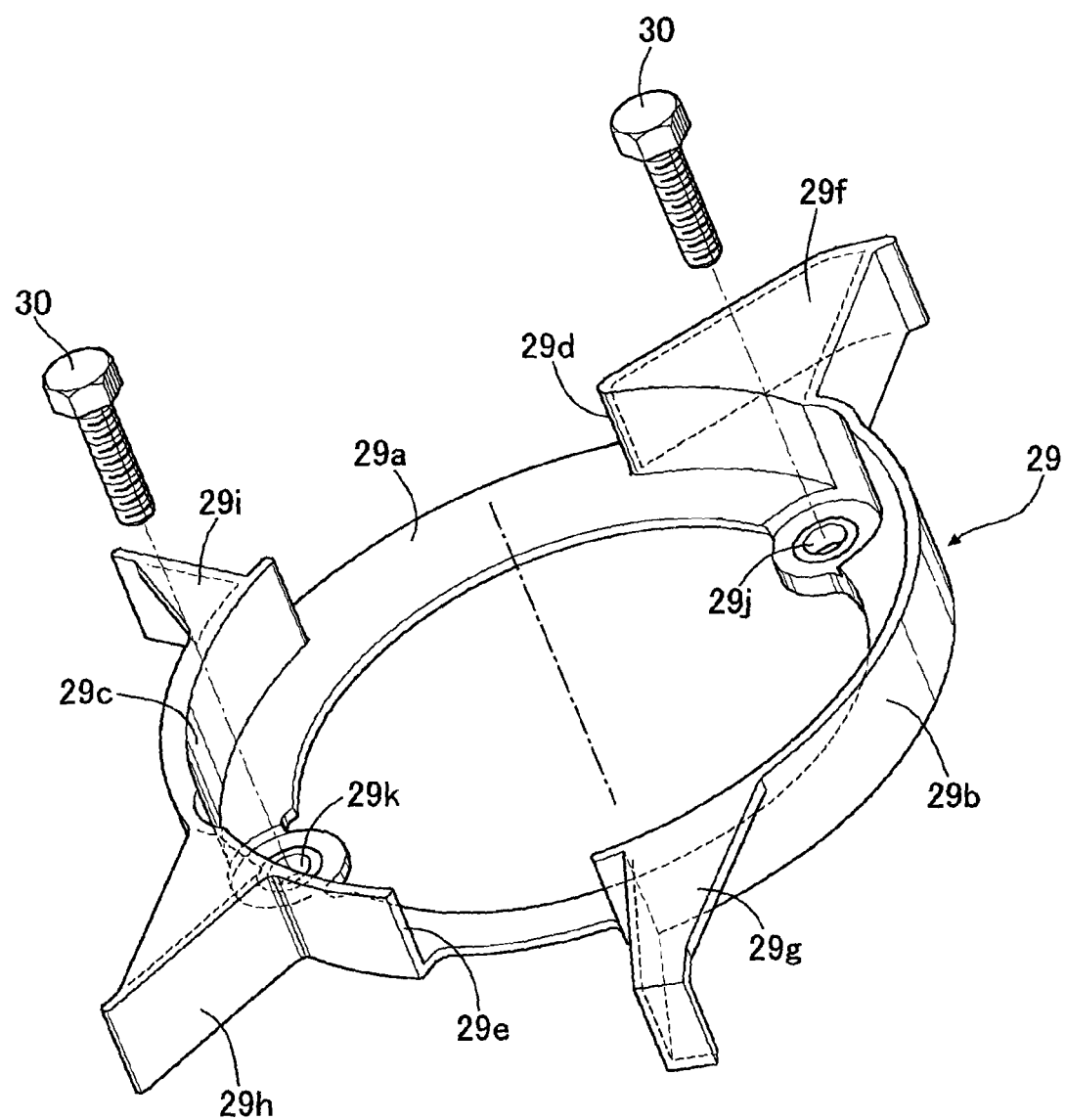
FIG. 6 is a perspective view of a cover member.

As shown in FIG. 1 and FIG. 2, a transmission case 11 of a belt type continuously variable transmission includes a first case 12 whose one end surface is joined to a not-illustrated engine, and a second case 13 which is joined to the first case 12 in such a manner as to cover the other end surface of the first case 12. An input shaft 14 and an output shaft 15 are supported parallel to each other by the first case 12 and the second case 13. An endless metal belt 18 is wrapped around a drive pulley 16, which is provided to the input shaft 14 located on a lower side, and a driven pulley 17, which is provided to the output shaft 15 located on an upper side.

The driven pulley 17 includes: a fixed pulley half 19 fixed to the output shaft 15 in such a manner as to face an inner wall surface of the second case 13; and a movable pulley half 20 which is supported onto the output shaft 15 in such a manner as to be unrotatable relative to the output shaft 15 and axially slidable, and is capable of coming close to and receding from the fixed pulley half 19 by use of hydraulic pressure. The drive pulley 16 similarly includes a fixed pulley half and a movable pulley half. By changing a groove width of the drive pulley 16 and a groove width of the driven pulley 17, effective radii of the pulleys 16 and 17 change accordingly whereby a transmission gear ratio is changed continuously.

Next, a structure of a parking lock device configured to restrain rotation of the output shaft 15 when stopping a vehicle will be described with reference to FIG. 1, FIG. 4, FIG. 5A, and FIG. 5B.

An annular parking gear 21 projecting toward the inner wall surface of the second case 13 is formed integrally on a back surface of the fixed pulley half 19 of the driven pulley 17. Multiple tooth spaces 21a are formed on an outer peripheral surface of the parking gear 21. An intermediate portion of the parking pole 23 bent into an inverted V-shape is swingably supported by a support shaft 22, which is fixed to a wall portion 12a of the first case 12 at a position radially outside of an outer peripheral surface of the driven pulley 17. A lock claw 23a engageable with one of the tooth spaces 21a of the parking gear 21 is formed in a tip end portion of the parking pole 23. The parking pole 23 is biased in a counterclockwise direction in FIG. 1 by resilient force of a torsion spring 24 wound around an outer periphery of the support shaft 22 such that the lock claw 23a recedes from the tooth spaces 21a of the parking gear 21.

A cone-shaped cam member 26 is provided at a tip end of a parking rod 25, which penetrates a through-hole 12b formed in the wall portion 12a of the first case 12 toward the second case 13. The parking rod 25 is connected to a not-illustrated shift lever (or an actuator) and is movable in the axial direction. The cam member 26 is guided by the through-hole 12b in the wall portion 12a, and by an arc-shaped guide surface 28a of a guide member 28 which is fixed to the wall portion 12a by using two bolts 27.

The inverted V-shaped parking pole 23 is formed to have its distance from the support shaft 22 to the lock claw 23a shorter than its distance from the support shaft 22 to the cam surface 23b.

Next, a structure of a cover member 29 to cover the parking gear 21 will be described with reference FIGS. 1 to 4 and 6.

The cover member 29 integrally molded from a synthetic resin includes: an annular side wall portion 29a; a first peripheral wall portion 29b and a second peripheral wall portion 29c which rise up in an axial direction from an outer periphery of the side wall portion 29a; a first opening 29d and a second opening 29e formed between mutually-opposing end portions of the first peripheral wall portion 29b and the second peripheral wall portion 29c; first and second arm portions 29f, 29g projecting outward in a radial direction from an outer peripheral surface of the first peripheral wall portion 29b; and third and fourth arm portions 29h, 29i projecting outward in the radial direction from an outer peripheral surface of the second peripheral wall portion 29c. The cover member 29 is fastened to screw holes 13a formed in the inner wall surface of the second case 13 by using two bolts 30, which penetrate a first boss portion 29j formed near a base of the first arm portion 29f in the side wall portion 29a and a second boss portion 29k formed near a base of the third arm portion 29h in the side wall portion 29a, respectively.

While the cover member 29 is fixed to the second case 13, the first opening 29d is opened upward and the second opening 29e is opened downward. Moreover, a tip end side of the parking pole 23 extends between the first and fourth arm portions 29f, 29i, and the lock claw 23a passes through the first opening 29d and is engageable with one of the tooth spaces 21a of the parking gear 21.

In a state where the belt type continuously variable transmission is completely assembled, a shaft end of the output shaft 15 is rotatably supported by the inner wall surface of the second case 13 via a roller bearing 31. A shaft portion 13c in which an oil passage 13b is formed projects from the inner wall surface of the second case 13, and the shaft portion 13c is fitted via a sealing member 32 into an oil passage 15a formed inside the output shaft 15. Thus, oil is supplied from the oil passage 13b in the shaft portion 13c to the oil passage 15a in the output shaft 15. Meanwhile, a side surface of the parking gear 21 faces the side wall portion 29a of the cover member 29 via a small clearance, and the outer peripheral surface of the parking gear 21 faces inner peripheral surfaces of the first peripheral wall portion 29b and the second peripheral wall portion 29c via a small clearance.

Next, operation of the first embodiment having the above-described configuration will be described.

When a driver selects a range other than a parking range by using the shift lever, the parking pole 23 is located at a non-operation position indicated with a solid line in FIG. 1 by the resilient force of the torsion spring 24. Here, the lock claw 23a of the parking pole 23 recedes from the tooth space 21a of the parking gear 21. Thus, restraint of the output shaft 15 is released and the parking lock device is brought into a non-operation state. When the driver selects the parking range by using the shift lever, the cam member 26 projects from the through-hole 12b and its cam surface 26a presses the cam surface 23b formed on a base end side of the parking pole 23 (see FIGS. 5A and 5B). As a consequence, the parking pole 23 swings in a clockwise direction in FIG. 1 around the support shaft 22 and the lock claw 23a engages with one of the tooth spaces 21a of the parking gear 21. Accordingly, the rotation of the output shaft 15 is restrained as indicated with a broken line in FIG. 1 and the parking lock device is thus operated.

In the meantime, when the belt type continuously variable transmission is assembled, the input shaft 14, the output shaft 15, the drive pulley 16, the driven pulley 17, the endless metal belt 18, the parking pole 23, the torsion spring 24, and the like are attached to the first case 12 in advance while the cover member 29, the roller bearing 31, and the like are attached to the second case 13 in advance. Then, as shown in FIG. 2, a joining face of the second case 13 is joined to a joining face of the first case 12, and the second case 13 is fastened to the first case 12 by using multiple bolts 33.

At this time, a shaft end portion of the output shaft 15 on the first case 12 side has to be fitted into an inner periphery of the roller bearing 31 on the second case 13 side, and a tip end of the shaft portion 13c of the second case 13 has to be fitted into the oil passage 15a of the output shaft 15 on the first case 12 side. Accordingly, the portions to be fitted are not fitted smoothly to one another unless the second case 13 is accurately positioned to the first case 12. Hence, there is a problem of deterioration in efficiency of assembly work.

However, in this embodiment, annular end edges of the first peripheral wall portion 29b and the second peripheral wall portion 29c of the cover member 29 fixed to the inner wall surface of the second case 13 in advance project from the joining face of the second case 13 toward the first case 12, so that the first peripheral wall portion 29b and the second peripheral portion 29c can face the outer peripheral surface of the parking gear 21 on the first case 12 side via the small clearance. Accordingly, when the second case 13 is joined, the second case 13 can be positioned to the first case 12 by firstly fitting the end edges of the first peripheral wall portion 29b and the second peripheral wall portion 29c of the cover member 29 to the outer peripheral surface of the parking gear 21.

Subsequently, when the second case 13 is brought closer to the first case 12 while causing the outer peripheral surface of the parking gear 21 to guide the inner peripheral surfaces of the first peripheral wall portion 29b and the second peripheral wall portion 29c, the shaft end portion of the output shaft 15 is smoothly fitted into the inner peripheral surface of the roller bearing 31 and the tip end of the shaft portion 13c of the second case 13 is smoothly fitted into the oil passage 15a of the output shaft 15. Thus, it is possible to perform work to join the second case 13 efficiently in a short time.

In a state where the second case 13 is joined to the first case 12, the outer peripheral surface of the parking gear 21 is covered with the first peripheral wall portion 29b and the second peripheral wall portion 29c of the cover member 29. Here, since the first opening 29d is formed between the end portions of the first peripheral wall portion 29b and the second peripheral wall portion 29c, the lock claw 23a of the parking pole 23 can be engaged with one of the tooth spaces 21a on the outer peripheral surface of the parking gear 21 through the first opening 29d without hindrance.

As shown in FIG. 1, the tip end portion of the parking pole 23 is located between the first arm portion 29f and the fourth arm portion 29i of the cover member 29. Here, if the parking pole 23 is attached to the support shaft 22 while placing its tip end side and base end side the other way round, the fourth arm portion 29i of the cover member 29 interferes with the cam surface 26b of the parking pole 23 since in the parking pole 23, the distance from the support shaft 22 to the lock claw 23a is short whereas the distance from the support shaft 22 to the cam surface 23b is long. Accordingly, when the second case 13 to which the cover member 29 is attached in advance is joined to the first case 12, the erroneously attached parking pole 23 interferes with the cover member 29 so that the second case 13 cannot be joined. Thus, it is possible to reliably prevent the erroneous attachment of the parking pole 23.

In the meantime, when a foreign substance enters the transmission case 11 or when a component disposed inside the transmission case 11 comes off and becomes a foreign substance, the lock claw 23a of the parking pole 23 cannot engage with the tooth space 21a of the parking gear 21 if such a foreign substance is caught between the lock claw 23a of the parking pole 23 and the tooth space 21a. In this case, the parking lock device may become inoperable.

However, according to the embodiment, the outer peripheral surface of the parking gear 21 is covered with the cover member 29 so that the cover member 29 can block the foreign substance to prevent the foreign substance from being caught between the lock claw 23a of the parking pole 23 and the tooth space 21a of the parking gear 21. In particular, an elongated foreign substance having flexibility is blocked by the first to fourth arm portions 29f to 29i extending radially from the cover member 29 and is prevented from winding around the outer periphery of the parking gear 21. Thus, it is possible to more reliably avoid a situation that the foreign substance makes the parking lock device inoperable.

Meanwhile, the second opening 29e is formed in a lower part of the cover member 29. Accordingly, even if a foreign substance enters the inside from the first opening 29d on an upper part of the cover member 29, it is possible to discharge the foreign substance through the second opening 29e to outside to prevent the foreign substance from being caught in the tooth space 21a.

Although the embodiment of the present invention has been described above, various design changes are possible without departing from the gist of the present invention.

For example, the transmission of the present invention is not limited to the belt type continuously variable transmission as in the embodiment, but may be a transmission of an arbitrary type.

In addition, in the embodiment, the parking gear 21 is formed integrally on the back surface of the fixed pulley half 19 of the driven pulley 17. Instead, an independent parking gear 21 may be fixed directly to the output shaft 15.

Meanwhile, the transmission shaft of the present invention is not limited to the output shaft 15 of the embodiment. The transmission shaft only needs to be a shaft that is always connected to drive wheels.

What is claimed is:

1. A transmission comprising:
   a first case;
   a second case to be joined to the first case;
   a transmission shaft connected to a drive wheel, the transmission shaft having opposite ends respectively supported by the first case and the second case;
   a parking gear fixed to the transmission shaft;
   a parking pole configured to engage with the parking gear for restraining rotation of the transmission shaft; and
   a cover member fixed to an inner wall surface of the second case, wherein
   the cover member extends into the first case to cover at least an outer peripheral surface of the parking gear with a predetermined clearance therebetween in a state where the second case is joined to the first case, the cover member configured to be guided with the outer peripheral surface of the parking gear in the process of joining the second case with the first case.

2. The transmission according to claim 1, further comprising:
   a support shaft configured to swingably support an intermediate portion of the parking pole;
   a lock claw formed on one end side of the parking pole and engageable with the parking gear;
   a pressed portion formed on another end side of the parking pole and pressed by a working member; and
   a first opening formed on an outer peripheral surface of the cover member to allow entry of the lock claw, wherein
   a distance from the support shaft to the lock claw is made different from a distance from the support shaft to the pressed portion.

3. The transmission according to claim 1, further comprising:
   a support shaft configured to swingably support an intermediate portion of the parking pole;
   a lock claw formed on one end side of the parking pole and configured to engage with the parking gear;
   a pressed portion formed on another end side of the parking pole and pressed by a working member;
   a first opening formed on an outer peripheral surface of the cover member to allow entry of the lock claw; and
   a second opening formed on the outer peripheral surface of the cover member at a position located below the first opening, wherein
   a distance from the support shaft to the lock claw is made different from a distance from the support shaft to the pressed portion.

4. The transmission according to any one of claims 1 to 3, wherein the cover member includes a plurality of arm portions projecting radially from the outer peripheral surface of the cover member.

5. An assembling method of a transmission, in which the transmission comprises:
   a first case;
   a second case to be joined to the first case;
   a transmission shaft connected to a drive wheel, the transmission shaft having opposite ends respectively supported by the first case and the second case;
   a parking gear fixed to the transmission shaft;
   a parking pole configured to engage with the parking gear for restraining rotation of the transmission shaft; and
   a cover member fixed to an inner wall surface of the second case, wherein
   the cover member extends into the first case to cover at least an outer peripheral surface of the parking gear with a predetermined clearance therebetween in a state where the second case is joined to the first case, the cover member configured to be guided with the outer peripheral surface of the parking gear in the process of joining the second case with the first case, wherein
   the method comprising joining the second case, to which the cover member is attached in advance, to the first case to which the transmission shaft is attached in advance.

6. The assembling method according to claim 5, wherein the transmission further comprises:
   a support shaft configured to swingably support an intermediate portion of the parking pole;
   a lock claw formed on one end side of the parking pole and configured to engage with the parking gear;
   a pressed portion formed on another end side of the parking pole and pressed by a working member;
   a first opening formed on the outer peripheral surface of the cover member to allow entry of the lock claw; and
   a second opening formed on the outer peripheral surface of the cover member at a position located below the first opening, wherein
   a distance from the support shaft to the lock claw is made different from a distance from the support shaft to the pressed portion.

* * * * *